(12) United States Patent
Paulsen et al.

(10) Patent No.: US 10,693,553 B1
(45) Date of Patent: Jun. 23, 2020

(54) HYBRID SATELLITE COMMUNICATION SYSTEM FOR COCKPIT, CABIN, AND CREW CONNECTIVITY

(71) Applicant: Rockwell Collins, Inc., Cedar Rapids, IA (US)

(72) Inventors: Lee M. Paulsen, Cedar Rapids, IA (US); Steven C. Atkins, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/575,111

(22) Filed: Sep. 18, 2019

(51) Int. Cl.
*H04W 4/00* (2018.01)
*H04B 7/185* (2006.01)
*H01Q 5/25* (2015.01)
*H04K 3/00* (2006.01)

(52) U.S. Cl.
CPC .......... *H04B 7/18508* (2013.01); *H01Q 5/25* (2015.01); *H04B 7/18521* (2013.01); *H04K 3/20* (2013.01)

(58) Field of Classification Search
CPC .. H04B 7/18508; H04B 7/18521; H01Q 5/25; H04K 3/20
USPC ........................................................ 455/431
See application file for complete search history.

(56) References Cited

U.S. PATENT DOCUMENTS

| | | | | |
|---|---|---|---|---|
| 6,184,827 B1 * | 2/2001 | Dendy | ..................... | H01Q 3/26 342/368 |
| 7,564,420 B2 * | 7/2009 | Jeon | ......................... | H01Q 3/08 343/757 |
| 8,005,034 B2 * | 8/2011 | Dankberg | ............ | H04B 7/1858 370/315 |
| 8,193,975 B2 * | 6/2012 | Zheng | ................... | H01Q 3/2605 342/354 |
| 8,249,585 B2 * | 8/2012 | Tronc | .................. | H04B 7/18563 455/429 |
| 8,526,941 B2 * | 9/2013 | Tseytlin | ............. | H04B 7/18591 455/427 |
| 9,276,664 B2 * | 3/2016 | Zufall | ..................... | H04W 76/15 |
| 9,750,079 B1 * | 8/2017 | Mitchell | ............ | H04B 7/18508 |
| 9,939,286 B2 * | 4/2018 | Raab | ................. | H04M 1/72536 |
| 10,270,550 B2 * | 4/2019 | Zufall | .................... | H04W 76/15 |
| 10,401,189 B2 * | 9/2019 | Raab | .................. | G01C 21/3682 |
| 2006/0227048 A1 * | 10/2006 | Mak | ........................ | H01Q 1/28 342/359 |

\* cited by examiner

*Primary Examiner* — Amancio Gonzalez
(74) *Attorney, Agent, or Firm* — Suiter Swantz pc llo (57) ABSTRACT

A hybrid satellite communication system for cockpit, cabin, and crew connectivity includes a hybrid antenna mountable on an exterior surface of an aircraft. The hybrid antenna includes an L-band antenna. The hybrid antenna includes a high-throughput antenna configured to operate on at least one of a ku-band or a ka-band. The hybrid satellite communication system includes a multi-constellation modem manager in communication with the hybrid antenna. The multi-constellation modem manager includes an L-band antenna modem card configured to communicate with the L-band antenna. The multi-constellation modem manager includes a high-throughput modem card configured to communicate with the high-throughput antenna. The multi-constellation modem manager is configured for simultaneous operation on multiple satellite constellations by simultaneously communicating via the L-band antenna and the high-throughput antenna.

15 Claims, 4 Drawing Sheets

HYBRID SATELLITE COMMUNICATION SYSTEM FOR COCKPIT, CABIN, AND CREW CONNECTIVITY

BACKGROUND

There is an ever-increasing need for full connectivity between the cockpit, cabin, and crew. Select systems known in the art may be able to meet certain requirements (e.g., with respect to availability, security, bandwidth, or the like) for a particular type of connection, but there is no single system that may be used across the board for multiple types of connections.

Overcoming the lack of a single system may include utilizing multiple antennas in separate installation. The multiple antennas, however, may result in increased capital expenditure, installation time, drag, and/or weight costs, which may reduce the profitability of operating the aircraft.

SUMMARY

A hybrid satellite communication system for cockpit, cabin, and crew connectivity is disclosed, in accordance with one or more embodiments of the disclosure. In one or more embodiments, the hybrid satellite communication system includes a hybrid antenna mountable on an exterior surface of an aircraft. The hybrid antenna includes an L-band antenna. The hybrid antenna includes a high-throughput antenna configured to operate on at least one of a ku-band or a ka-band. The hybrid satellite communication system includes a multi-constellation modem manager in communication with the hybrid antenna. The multi-constellation modem manager includes an L-band antenna modem card configured to communicate with the L-band antenna. The multi-constellation modem manager includes a high-throughput modem card configured to communicate with the high-throughput antenna. The multi-constellation modem manager is configured for simultaneous operation on multiple satellite constellations by simultaneously communicating via the L-band antenna and the high-throughput antenna.

In some embodiments, the L-band antenna and the high-throughput antenna are positioned underneath a radome. The positioning of the L-band antenna and the high-throughput antenna is dependent on a spacing selected to prevent the L-band antenna and the high-throughput antenna from jamming.

In some embodiments, the hybrid antenna is dimensioned to fit within a footprint defined by an ARINC-781 standard.

In some embodiments, the hybrid antenna is dimensioned to fit within a footprint defined by an ARINC-792 standard.

In some embodiments, the L-band antenna is a low-gain antenna.

In some embodiments, the L-band antenna is a high-gain antenna.

In some embodiments, the hybrid antenna is in a low earth orbit (LEO)-low earth orbit (LEO) configuration.

In some embodiments, the high-throughput antenna of the low earth orbit (LEO)-low earth orbit (LEO) configuration includes a full-duplex transmitter array and a full-duplex receiver array. The full-duplex transmitter array and the full-duplex receiver array are configured to operate simultaneously.

In some embodiments, the high-throughput antenna of the low earth orbit (LEO)-low earth orbit (LEO) configuration includes a transmission/receiver half-duplex array. The transmission/receiver half-duplex array is configured to switch between and operate either a transmitting channel or a receiving channel at a particular time.

In some embodiments, the hybrid antenna is in a low earth orbit (LEO)-geostationary earth orbit (GEO) configuration.

In some embodiments, the high-throughput antenna of the low earth orbit (LEO)-geostationary earth orbit (GEO) configuration includes a full-duplex transmitter array and a full-duplex receiver array. The full-duplex transmitter array and the full-duplex receiver array are configured to operate simultaneously.

In some embodiments, the multi-constellation modem manager is configured to receive data from an aircraft sensor of the aircraft on which the hybrid antenna is mounted.

In some embodiments, the multi-constellation modem manager is configured to receive data from an aircraft component of the aircraft on which the hybrid antenna is mounted.

In some embodiments, the multi-constellation modem manager is configured to receive data or transmit data from an aircraft performance module.

A hybrid antenna of a hybrid satellite communication system for cockpit, cabin, and crew connectivity is disclosed, in accordance with one or more embodiments of the disclosure. In one or more embodiments, the hybrid antenna is mountable on an exterior surface of an aircraft. The hybrid antenna includes an L-band antenna configured to communicate with an L-band antenna modem card of a multi-constellation modem manager. The hybrid antenna includes a high-throughput antenna configured to operate on at least one of a ku-band or a ka-band. The high-throughput antenna is configured to communicate with a high-throughput modem card of the multi-constellation modem manager. The multi-constellation modem manager is configured for simultaneous operation on multiple satellite constellations by simultaneously communicating via the L-band antenna and the high-throughput antenna.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

In general, FIGS. 1-4 illustrate a hybrid satellite communication ("satcom") system 100 for cockpit, cabin, and crew connectivity, in accordance with one or more embodiments of the disclosure. It is noted herein that "hybrid satellite communication system 100" and variants of the term "hybrid satellite communication system 100" (e.g., "hybrid system 100", "satellite communication system 100," "communication system 100," "satcom system 100", "system 100," or the like) may be considered equivalent for purposes of the disclosure.

Figure 1:
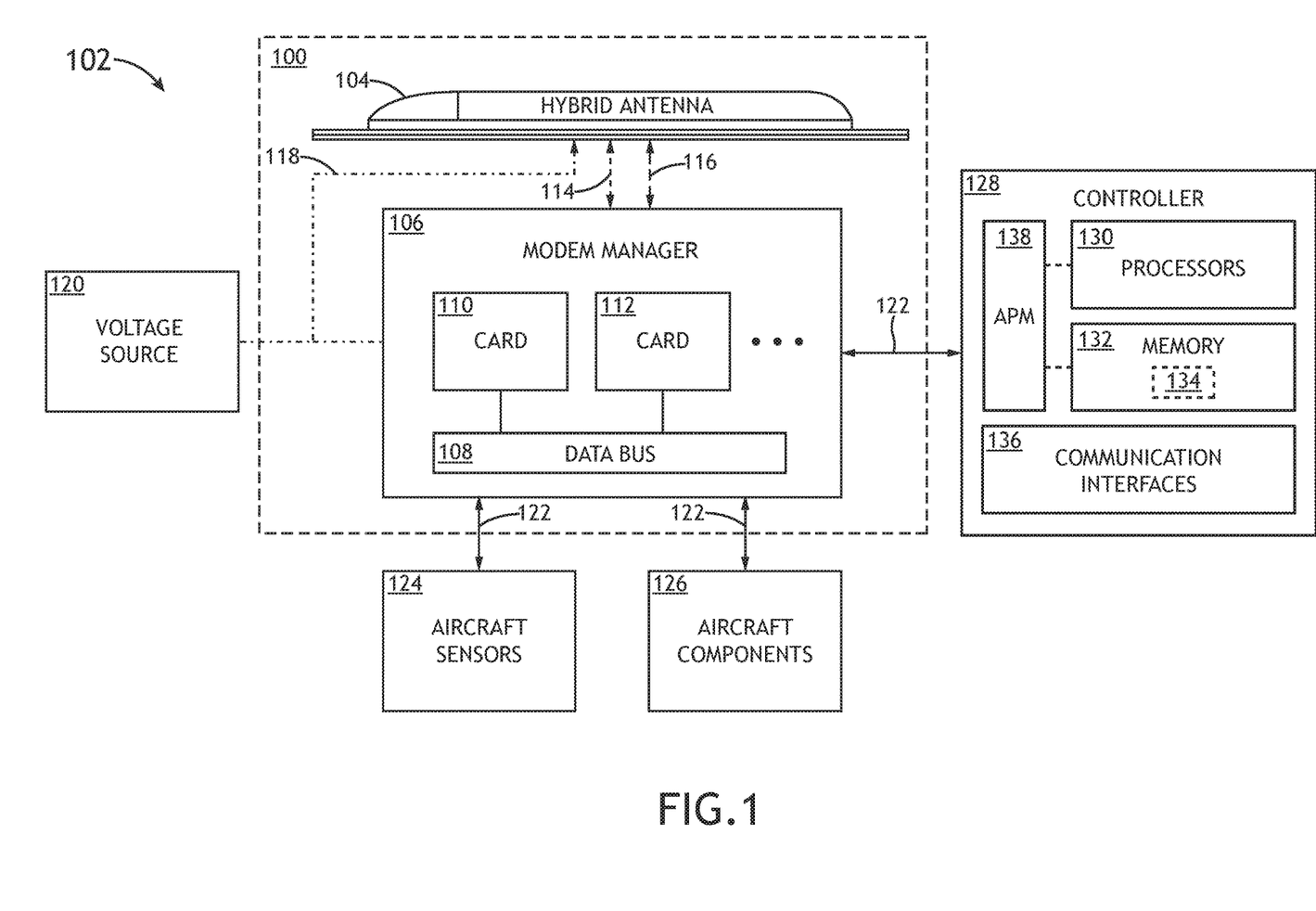
FIG. 1 is a block diagram of an aircraft including a hybrid satellite communication system for cockpit, cabin, and crew connectivity, in accordance with one or more embodiments of the disclosure.

FIG. 1 illustrates a block diagram of an aircraft 102 including the hybrid satellite communication system 100 for cockpit, cabin, and crew connectivity, in accordance with one or more embodiments of the disclosure.

The hybrid satellite communication system 100 may include a hybrid antenna 104. The hybrid antenna 104 may be configured to couple to an exterior surface of the aircraft 102. The hybrid antenna 104 (and/or other components of the hybrid satellite communication system 100) may be configured in accordance with guidelines and/or standards put forth by, but not limited to, the Aeronautical Radio, Incorporated (ARINC).

Figure 2:
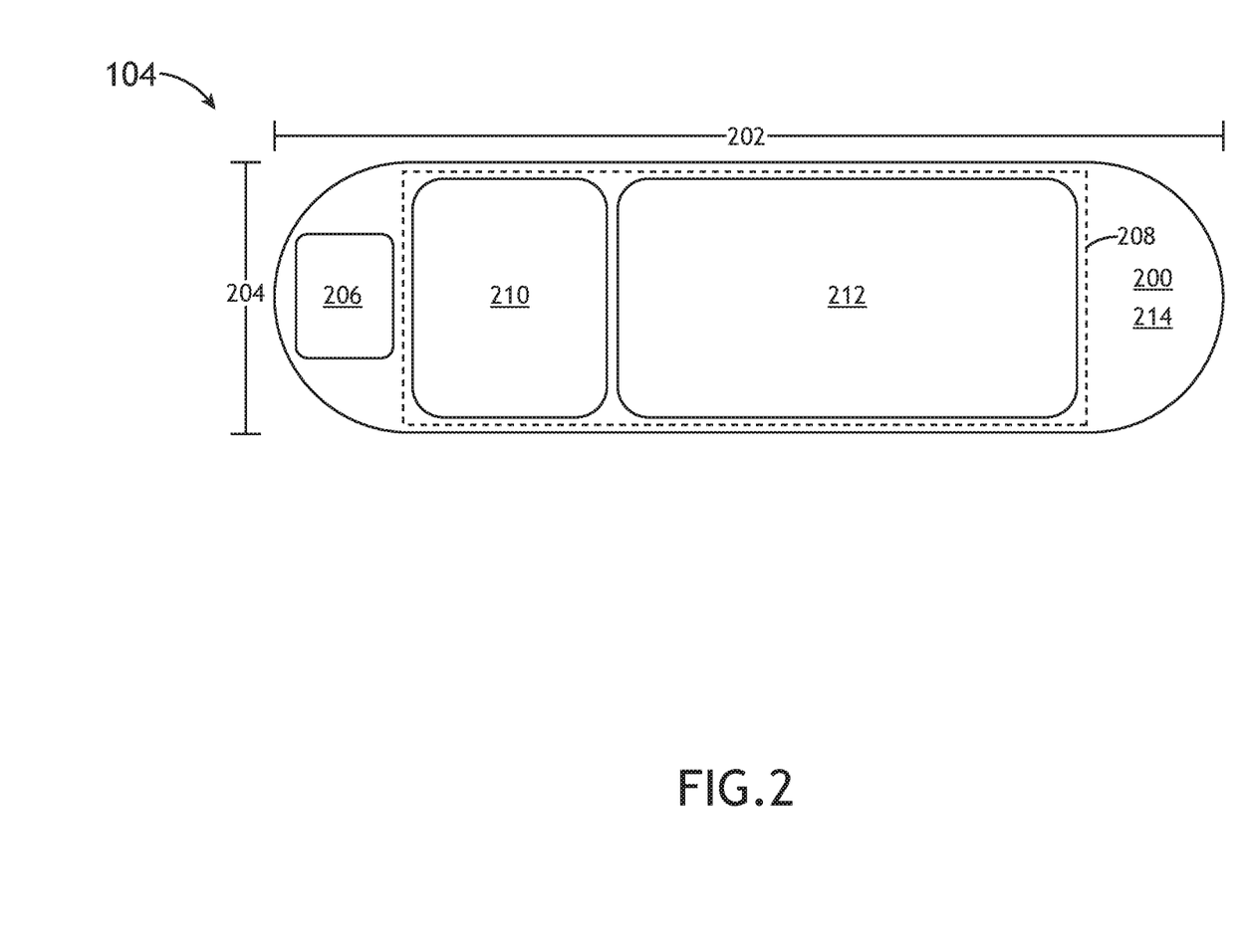
FIG. 2 is a block diagram of a hybrid antenna of the hybrid satellite communication system of FIG. 1 for cockpit, cabin, and crew connectivity, in accordance with one or more embodiments of the disclosure.
Figure 3:
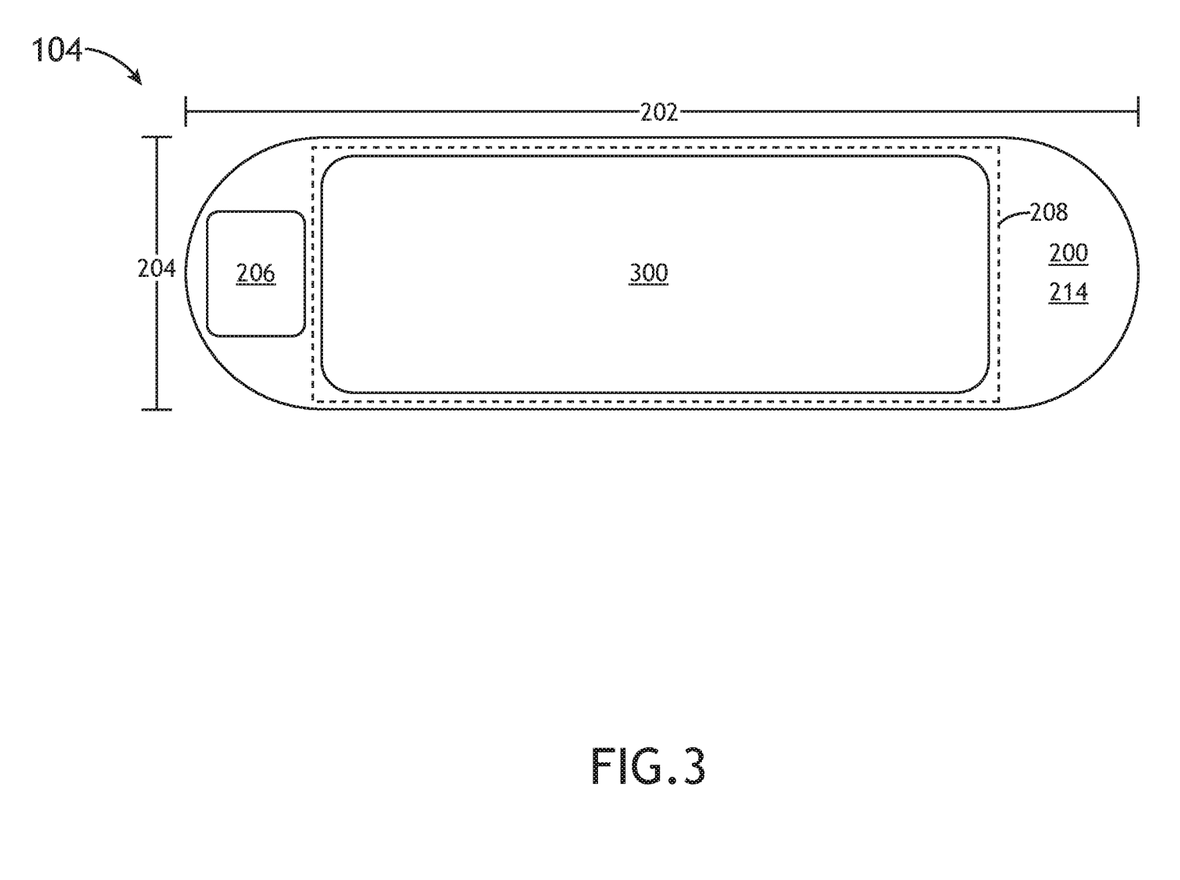
FIG. 3 is a block diagram of a hybrid antenna of the hybrid satellite communication system of FIG. 1 for cockpit, cabin, and crew connectivity, in accordance with one or more embodiments of the disclosure.

FIGS. 2 and 3 illustrates examples of the hybrid antenna 104 of the hybrid satellite communication system 100 for cockpit, cabin, and crew connectivity, in accordance with one or more embodiments of the disclosure.

The hybrid antenna 104 may be configured or dimensioned to fit within an ARINC-781 footprint. It is noted herein that being configured or dimensioned to fit within the ARINC-781 footprint may allow the hybrid satellite communication system 100 to be capable of a desired throughput capacity (e.g., 100 Megabit per second (Mbps)), latency, and availability for the cockpit, cabin, and crew domains.

The hybrid antenna 104 may include a cover plate 200. For example, the cover plate 200 may include a length dimension 202 and a width dimension 204. For instance, the cover plate 200 may conform with the ARINC-781 footprint, such that the length dimension 202 may be 40 inches and the width dimension 204 may be 11 inches.

The hybrid antenna 104 may include an L-band antenna. For example, the L-band antenna may include a low-gain antenna 206 (LGA 206). In general, the low-gain antenna 206 may include any antenna configured to operate at frequencies ranging from 1 gigahertz (GHz) to 2 gigahertz (GHz). For example, the low-gain antenna 206 may include, but is not limited to, an IRIDIUM NEXT low-gain antenna configured to operate at frequencies ranging from 1616 megahertz (MHz) to 1626.5 megahertz (MHz), an INMARSAT low-gain antenna configured to operate at frequencies ranging from 1525 MHz and 1646.5 MHz, or the like.

The hybrid antenna 104 may include a high-throughput antenna 208. In general, the high-throughput antenna 208 may include any antenna configured to operate on a ku-band at frequencies ranging from 12 GHz to 18 GHz, and/or may include any antenna configured to operate on a ka-band at frequencies ranging from 26.5 GHz to 40 GHz. For example, the high-throughput antenna 208 may include a ONEWEB high-throughput antenna, a STARLINK high-throughput antenna, or the like.

It is noted herein the frequency ranges for the low-gain antenna 206 and/or for the high-throughput antenna 208 (e.g., for the frequency ranges for the ku-band and/or the ka-band) may be defined by the Institute of Electrical and Electronics Engineers (IEEE) Standard 521-2002.

As illustrated in FIG. 2, the hybrid antenna 104 may include a full-duplex low earth orbit (LEO)-low earth orbit (LEO) configuration. In the full-duplex LEO-LEO configuration illustrated in FIG. 2, the high-throughput antenna 208 may include a full-duplex transmitter array 210 and a full-duplex receiver array 212. The full-duplex transmitter array 210 and the full-duplex receiver array 212 may be configured to transmit and receive simultaneously or substantially simultaneously (e.g., at the same time), such that the hybrid antenna 104 may be configured to transmit and receive simultaneously or substantially simultaneously (e.g., at the same time). For example, one or more of the full-duplex transmitter array 210 or the full-duplex receiver array 212 may be configured to operate on a one-hundred percent duty cycle. It is noted herein, however, that the duty cycle of the full-duplex configuration may be adjusted based on actual network usage. For example, the full-duplex configuration may be powered down when the hybrid satellite communication system 100 is not transmitting data packets, adjusting (e.g., reducing) the duty cycle of the full-duplex configuration.

As illustrated in FIG. 3, the hybrid antenna 104 may include a half-duplex LEO-LEO configuration. In the half-duplex LEO-LEO configuration illustrated in FIG. 3, the high-throughput antenna 208 may include a half-duplex transmission/receiver array 300. The half-duplex transmission/receiver array 300 may be configured to either transmit or receive at a particular time, such that the hybrid antenna 104 may be configured to either transmit or receive at the particular time. For example, the half-duplex transmission/receiver array 300 may be configured to switch between the transmitting channel and the receiving channel. For instance, the transmission/receiver half-duplex array 300 may be configured to switch between the transmitting channel and the receiving channel on a fifty percent duty cycle. It is noted herein, however, that the duty cycle of the half-duplex configuration may be adjusted based on actual network usage. For example, the half-duplex configuration may be powered down when the hybrid satellite communication system 100 is not transmitting data packets, adjusting (e.g., reducing) the duty cycle of the transmitting operation and/or the duty cycle of the receiving operation of the half-duplex configuration.

The cover plate 200 may be proximate to or abut a radome 214 (e.g., an example radome being illustrated in FIG. 1). The L-band antenna (e.g., the low-gain antenna 206, or the like) and the high-throughput antenna 208 may be positioned under the radome 214. The positioning of the L-band antenna and the high-throughput antenna 208 may be dependent on a spacing or distance selected to prevent the L-band antenna and the high-throughput antenna 208 from jamming and/or otherwise interfering with one another. For example, the L-band antenna and the high-throughput antenna 208 may be spaced apart to be positioned at opposite ends of the cover plate 200 underneath the radome 214. By way of another example, a distance between the L-band antenna and the high-throughput antenna 208 may be defined by the length dimension 202 of the cover plate 200.

Figure 4:
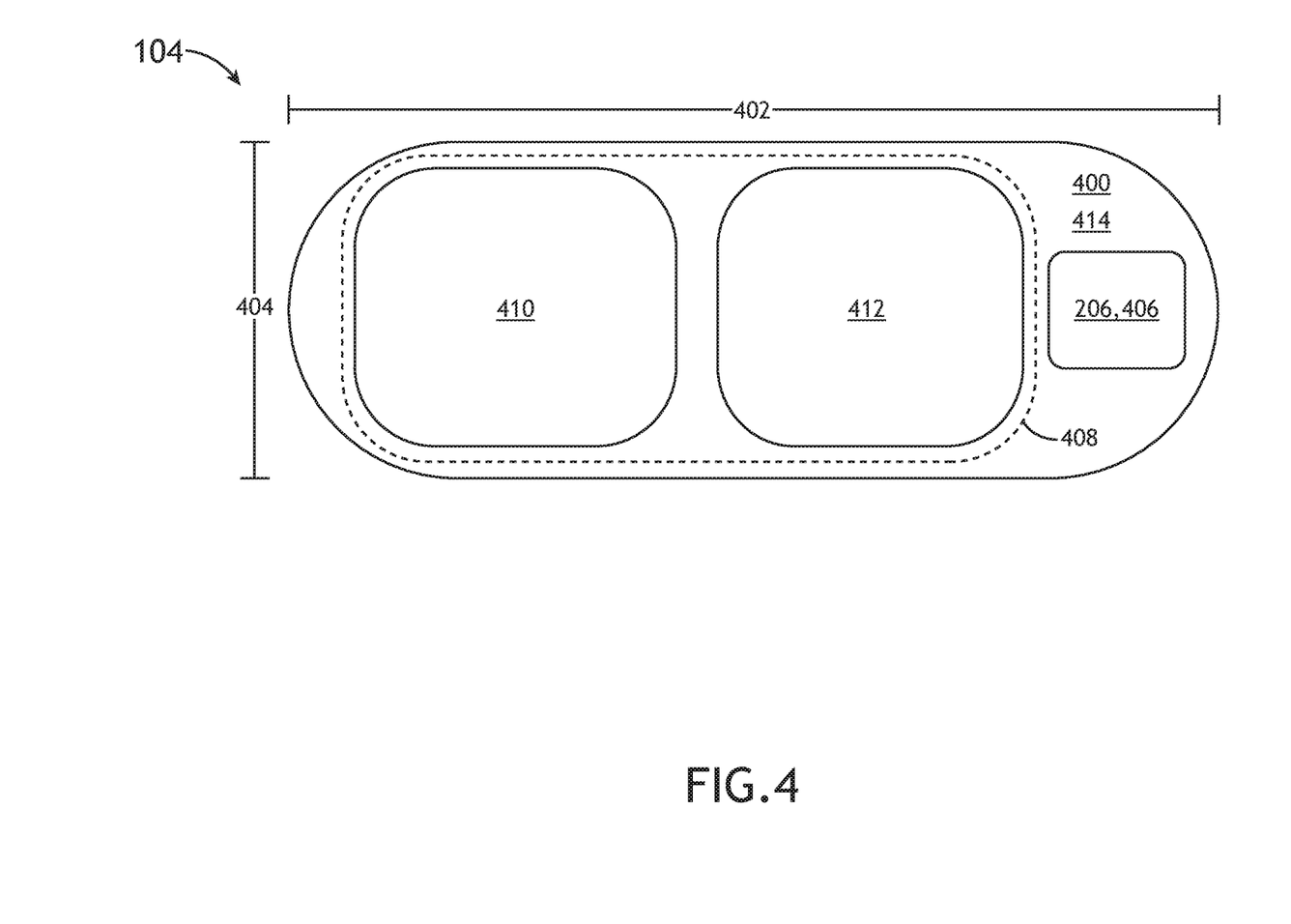
FIG. 4 is a block diagram of a hybrid antenna of the hybrid satellite communication system of FIG. 1 for cockpit, cabin, and crew connectivity, in accordance with one or more embodiments of the disclosure.

FIG. 4 illustrates an example of the hybrid antenna 104 of the hybrid satellite communication system 100 for cockpit, cabin, and crew connectivity, in accordance with one or more embodiments of the disclosure.

The hybrid antenna 104 may be configured or dimensioned to fit within an ARINC-792 footprint. It is noted herein that being configured or dimensioned to fit within the ARINC-792 footprint may allow the hybrid satellite communication system 100 to be a physically larger system, such that it may be capable of a maximum throughput capacity (e.g., 1000 Mbps), latency, and availability for the cockpit, cabin, and crew domains.

The hybrid antenna 104 may include a cover plate 400. For example, the cover plate 400 may include a length dimension 402 and a width dimension 404. For instance, the cover plate 400 may conform with the ARINC-792 footprint, such that the length dimension 402 may be 72 inches and the width dimension 404 may be 30 inches.

The hybrid antenna 104 may include an L-band antenna. For example, the L-band antenna may include the low-gain antenna 206 (LGA 206). By way of another example, the L-band antenna may include a high-gain antenna 406 (HGA 406). In general, the low-gain antenna 206 or the high-gain antenna 406 may include any antenna configured to operate at frequencies ranging from 1 gigahertz (GHz) to 2 gigahertz (GHz). For example, the low-gain antenna 206 may include, but is not limited to, an IRIDIUM NEXT low-gain antenna configured to operate at frequencies ranging from 1616 megahertz (MHz) to 1626.5 megahertz (MHz), an INMARSAT low-gain antenna configured to operate at frequencies ranging from 1525 MHz and 1646.5 MHz, or the like. By way of another example, the high-gain antenna 406 may include, but is not limited to, an IRIDIUM NEXT high-gain antenna configured to operate at frequencies ranging from 1616 megahertz (MHz) to 1626.5 megahertz (MHz), or the like.

The hybrid antenna 104 may include a high-throughput antenna 408. In general, the high-throughput antenna 408 may include any antenna configured to operate on a ku-band at frequencies ranging from 12 GHz to 18 GHz, and/or may include any antenna configured to operate on a ka-band at frequencies ranging from 26.5 GHz to 40 GHz. For example, the high-throughput antenna 408 may include a ONEWEB high-throughput antenna, an INTELSAT high-throughput antenna, a GLOBAL EXPRESS high-throughput antenna, a GOGO 2KU high-throughput antenna, a PANASONIC ku-band high-throughput antenna, or the like.

It is noted herein the frequency ranges for the high-gain antenna 406 and/or for the high-throughput antenna 408 (e.g., for the frequency ranges for the ku-band and/or the ka-band) may be defined by the Institute of Electrical and Electronics Engineers (IEEE) Standard 521-2002.

As illustrated in FIG. 4, the hybrid antenna 104 may include a full-duplex LEO-LEO configuration. In the full-duplex LEO-LEO configuration illustrated in FIG. 4, the high-throughput antenna 408 may include a full-duplex transmitter array 410 and a full-duplex receiver array 412. The full-duplex transmitter array 410 and the full-duplex receiver array 412 may be configured to transmit and receive simultaneously or substantially simultaneously (e.g., at the same time), such that the hybrid antenna 104 may be configured to transmit and receive simultaneously or substantially simultaneously (e.g., at the same time). For example, the full-duplex transmitter array 410 and the full-duplex receiver array 412 may be configured to operate on a one-hundred percent duty cycle. It is noted herein, however, that the duty cycle of the full-duplex configuration may be adjusted based on actual network usage. For example, the full-duplex configuration may be powered down when the hybrid satellite communication system 100 is not transmitting data packets, reducing the duty cycle of the full-duplex configuration.

It is noted herein, however, that the hybrid antenna 104 as illustrated in FIG. 4 may instead include a hybrid low earth orbit (LEO)-geostationary orbit (GEO) configuration. In the LEO-GEO configuration illustrated in FIG. 4, the high-throughput antenna 408 may include a transmitter array 410 and a receiver array 412, where the transmitter array 410 and the receiver array 412 may be configured to operate on a one-hundred percent duty cycle or other duty cycle based on actual network usage.

The cover plate 400 may be proximate to or abut a radome 414 (e.g., an example radome being illustrated in FIG. 1). The L-band antenna (e.g., the low-gain antenna 206, the high-gain antenna 406, or the like) and the high-throughput antenna 408 may be positioned under the radome 414. The positioning of the L-band antenna and the high-throughput antenna 408 may be dependent on a spacing or distance selected to prevent the L-band antenna and the high-throughput antenna 408 from jamming and/or otherwise interfering with one another. For example, the L-band antenna and the high-throughput antenna 408 may be spaced apart to be positioned at opposite ends of the cover plate 400 underneath the radome 414. By way of another example, a distance between the L-band antenna and the high-throughput antenna 408 may be defined by the length dimension 402 of the cover plate 400.

It is noted herein the L-band antenna (e.g., the low-gain antenna 206 and/or the high-gain antenna 406) may be suitable for cockpit communication but not cabin communication (e.g., meeting availability and security requirements but not cabin latency requirement or bandwidth requirements of greater than 50 megabytes per second (Mbps)). In addition, it is noted herein the high-throughput antenna may be suitable for cabin communication but not cockpit communication. In this regard, combining an L-band antenna with a high-throughput antenna in the hybrid antenna 104 may result in a system 100 capable of supporting cockpit, cabin, and crew needs simultaneously. In addition, combining the L-band antenna with the high-throughput antenna within a co-location having a select ARINC footprint may result in a system 100 with a small form factor that has reduced drag and weight as compared to known aircraft-mountable antennas in the art. Further, combining the L-band antenna with the high-throughput antenna within a co-location having a select ARINC footprint may result in a system 100 that has a lower installation capital expenditure (e.g., due to cost in terms of money, time, modification to an existing aircraft 102 to convert to the hybrid satellite communication system 100, or the like).

In this regard, configuring a hybrid antenna 104 capable of simultaneous support of cockpit, cabin, and crew connectivity to fit in either the ARINC-781 footprint or the ARINC-792 footprint may result in a hybrid satellite communication system 100 that is lightweight, simpler-to-install, faster-to-install, and requiring fewer line-replaceable units (LRUs) than if separate cockpit, cabin, and crew satellite communication systems were installed.

Although embodiments of the disclosure are directed to the hybrid antenna 104 (and/or other components of the hybrid satellite communication system 100) being configured to comply with guidelines and/or standards put forth by ARINC, it is noted herein that the hybrid antenna 104 (and/or other components of the hybrid satellite communication system 100) may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), the Institute of Electrical and Electronics Engineers (IEEE), or any other standards setting organization or company; the Radio Technical Commission for Aeronautics (RTCA) or any other guidelines agency or organization; or the like. Therefore, the above description should not be interpreted as a limitation on the disclosure but merely an illustration.

Referring again to FIG. 1, the hybrid satellite communication system 100 may include a modem manager 106 (or modman 106) configured for supporting different modems for cockpit, cabin, and crew connectivity. In one example, the modem manager 106 may be a multi-constellation modem manager configured to receive signals from and/or transmit signals to multiple constellations (e.g., Global Positioning System (GPS), Global Navigation Satellite System (GLONASS), Galileo, BeiDou, or the like). It is noted herein that access to multiple constellations may result in reduced signal acquisition time or uncertainly and/or reduced issues with obstructions due to improved distribution of accessible satellites. Here, the hybrid satellite communication system 100 may be capable of simultaneous operation on multiple satellite constellations (e.g., LEO, GEO, or the like) with different levels of security to support cabin, cockpit, and crew domains.

The modem manager 106 may be configured to receive one or more modem cards within a data bus 108. For example, a data bus 108 terminal may couple to a modem card 110 (e.g., an L-band modem card 110) configured to communicate with an L-band antenna (e.g., the low-gain antenna 206, the high-gain antenna 406, or the like). By way of another example, a data bus 108 terminal may couple to a modem card 112 (e.g., a high-throughput modem card 112) configured to communicate with a high-throughput antenna (e.g., the high-throughput antenna 408, or the like). By way of another example, the modem manager 106 may include one or more open data bus 108 terminals for expansion of the hybrid satellite communication system 100.

The modem manager 106 may be configured to acquire and/or distribute input/output (I/O) data 114 with the hybrid antenna 104. The modem manager 106 may be configured to receive and/or transmit data 116 via the transmitting arrays and the receiving arrays of the hybrid antenna 104.

One or more of the hybrid antenna 104 and/or the modem manager 106 may receive voltage 118 from an aircraft voltage source 120. For example, the voltage 118 may be 115 volts of alternating current power (VAC).

The modem manager may acquire and/or distribute aircraft data 122. For example, the aircraft data 122 may include sensor data from one or more aircraft sensors 124. By way of another example, the aircraft data 122 may include component operation data from one or more aircraft components 126. By way of another example, the aircraft data 122 may include information from one or more controllers 128.

The modem manager 106 may be coupled (e.g., physically, electrically, and/or communicatively) to the one or more controllers 128. The one or more controllers 128 may be housed within the aircraft 102. It is noted herein, however, that the one or more controllers 128 may instead be controllers located offboard the aircraft (e.g., at an air traffic control tower, at a ground maintenance station, on a manufacturing line, at a quality control test bench, or the like). For example, the modem manager 106 may be configured to transmit data to and/or receive data from the onboard one or more controllers 128 and/or the one or more offboard controllers. By way of another example, the modem manager 106 may be configured to record event logs and transmit the event logs to the onboard one or more controllers 128 and/or the one or more offboard controllers. By way of another example, the modem manager 106 may be configured to receive information and/or commands from the onboard one or more controllers 128 and/or the one or more offboard aircraft controllers, in response to or independent of the transmitted event logs.

It is noted herein that data transfer between the hybrid antenna 104, the modem manager 106, the one or more aircraft sensors 124, the one or more aircraft components 126, and/or the one or more controllers 128 may be dictated by the ARINC 429 data transfer standard.

A controller 128 of the one or more controllers 128 may include one or more processors 130, memory 132 configured to store one or more sets of program instructions 134, and/or one or more communication interfaces 136.

The controller 128 may include an aircraft performance module (APM) 138. The APM 138 may be set up in a number of configurations depending on the build of the aircraft 102. For example, the APM 138 may be a separate component from the controller 128. By way of another example, the aircraft performance module 138 may be coupled to or integrated within the one or more processors 130 and/or the memory 132 configured to store one or more sets of program instructions 134. For instance, the aircraft performance module 138 may be a particular set of the one or more sets of program instructions 134 executable by a processor of the one or more processors 130. By way of another example, the APM 138 and the controller 128 may be the same component. It is noted herein, however, that the APM 138 may be an optional component either directly or indirectly coupled to the modem manager 106.

The one or more processors 130 provide processing functionality for at least the one or more controllers 128 and may include any number of processors, micro-controllers, circuitry, field programmable gate array (FPGA) or other processing systems, and resident or external memory for storing data, executable code, and other information accessed or generated by the one or more controllers 128. The one or more processors 130 may execute one or more software programs (e.g., the one or more sets of program instructions 134) embodied in a non-transitory computer readable medium (e.g., the memory 132) that implement techniques described herein. The one or more processors 130 are not limited by the materials from which they are formed or the processing mechanisms employed therein and, as such, may be implemented via semiconductor(s) and/or transistors (e.g., using electronic integrated circuit (IC) components), and so forth.

The memory 132 may be an example of tangible, computer-readable storage medium that provides storage functionality to store various data and/or program code associated with operation of the one or more controllers 128 and/or one or more processors 130, such as software programs and/or code segments, or other data to instruct the one or more processors 130 and/or other components of the one or more controllers 128, to perform the functionality described herein. Thus, the memory 132 may store data, such as a program of instructions for operating the one or more controllers 128, including its components (e.g., one or more processors 130, the one or more communication interfaces 136, or the like), and so forth. It should be noted that while a single memory 132 is described, a wide variety of types and combinations of memory (e.g., tangible, non-transitory memory) may be employed. The memory 132 may be integral with the one or more processors 130, may include stand-alone memory, or may be a combination of both. Some examples of the memory 132 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The one or more controllers 128 may be configured to perform one or more process steps, as defined by the one or more sets of program instructions 134. The one or more process steps may be performed iteratively, concurrently, and/or sequentially. The one or more sets of program instructions 134 may be configured to operate via a control algorithm, a neural network (e.g., with states represented as nodes and hidden nodes and transitioning between them until an output is reached via branch metrics), a kernel-based classification method, a Support Vector Machine (SVM) approach, canonical-correlation analysis (CCA), factor analysis, flexible discriminant analysis (FDA), principal component analysis (PCA), multidimensional scaling (MDS), principal component regression (PCR), projection pursuit, data mining, prediction-making, exploratory data analysis, supervised learning analysis, boolean logic (e.g., resulting in an output of a complete truth or complete false value), fuzzy logic (e.g., resulting in an output of one or more partial truth values instead of a complete truth or complete false value), or the like. For example, in the case of a control algorithm, the one or more sets of program instructions 134 may be configured to operate via proportional control, feedback control, feedforward control, integral control, proportional-derivative (PD) control, proportional-integral (PI) control, proportional-integral-derivative (PID) control, or the like.

The one or more communication interfaces 136 may be operatively configured to communicate with components of the one or more controllers 128. For example, the one or more communication interfaces 136 may be configured to retrieve data from the one or more processors 130 or other devices, transmit data for storage in the memory 132, retrieve data from storage in the memory 132, and so forth. The one or more communication interfaces 136 may also be coupled (e.g., physically, electrically, and/or communicatively) with the one or more processors 130 to facilitate data transfer between components of the one or more controllers 128 and the one or more processors 130. It should be noted that while the one or more communication interfaces 136 are described as a component of the one or more controllers 128, one or more components of the one or more communication interfaces 136 may be implemented as external components coupled (e.g., physically, electrically, and/or communicatively) to the one or more controllers 128 via a wired and/or wireless connection. The one or more controllers 128 may also include and/or connect to one or more input/output (I/O) devices. In embodiments, the one or more communication interfaces 136 includes or is coupled (e.g., physically, electrically, and/or communicatively) to a transmitter, receiver, transceiver, physical connection interface, or any combination thereof.

The one or more controllers 128 may be coupled (e.g., physically, electrically, and/or communicatively) to one or more user interfaces. The one or more user interfaces may include and/or be configured to interact with one or more display devices. The one or more user interfaces may include and/or be configured to interact with one or more data input devices.

The one or more communication interfaces 136 may be operatively configured to communicate with one or more user interfaces. The one or more controllers 128 and the one or more user interfaces may be separate components (e.g., have separate housings and/or separate chassis). It is noted herein, however, that the one or more controllers 128 and the one or more user interfaces may be components integrated in a single housing and/or on a single chassis.

The one or more display devices may include any display device known in the art. For example, the one or more display devices may include, but are not limited to, a liquid crystal display (LCD), a light-emitting diode (LED) display, an organic light-emitting diode (OLED) based display, or the like. Those skilled in the art should recognize that a variety of display devices may be suitable for implementation in the disclosure and the particular choice of display device may depend on a variety of factors, including, but not limited to, form factor, cost, and the like. In a sense, any display device capable of integration with the one or more data input devices (e.g., touchscreen, bezel mounted interface, keyboard, mouse, trackpad, and the like) is suitable for implementation in the disclosure.

The one or more data input devices may include any data input device known in the art. For example, the one or more data input devices may include, but are not limited to, a keyboard, a keypad, a touchscreen, a lever, a knob, a scroll wheel, a track ball, a switch, a dial, a sliding bar, a scroll bar, a slide, a touch pad, a paddle, a steering wheel, a joystick, a button, a bezel input device or the like. In the case of a touchscreen interface, those skilled in the art should recognize that a large number of touchscreen interfaces may be suitable for implementation in the disclosure. For instance, a display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the disclosure.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A hybrid satellite communication system for cockpit, cabin, and crew connectivity, comprising:
    a hybrid antenna mountable on an exterior surface of an aircraft, the hybrid antenna comprising:
        an L-band antenna; and
        a high-throughput antenna configured to operate on at least one of a ku-band or a ka-band; and
    a multi-constellation modem manager in communication with the hybrid antenna, the multi-constellation modem manager comprising:
        an L-band antenna modem card configured to communicate with the L-band antenna; and
        a high-throughput modem card configured to communicate with the high-throughput antenna,
    the multi-constellation modem manager being configured for simultaneous operation on multiple satellite constellations by simultaneously communicating via the L-band antenna and the high-throughput antenna.

2. The hybrid satellite communication system of claim 1, the L-band antenna and the high-throughput antenna being positioned underneath a radome, the positioning dependent on a spacing selected to prevent the L-band antenna and the high-throughput antenna from jamming.

3. The hybrid satellite communication system of claim 1, the hybrid antenna being dimensioned to fit within a footprint defined by an ARINC-781 standard.

4. The hybrid satellite communication system of claim 1, the hybrid antenna being dimensioned to fit within a footprint defined by an ARINC-792 standard.

5. The hybrid satellite communication system of claim 1, the L-band antenna being a low-gain antenna.

6. The hybrid satellite communication system of claim 1, the L-band antenna being a high-gain antenna.

7. The hybrid satellite communication system of claim 1, the hybrid antenna being in a low earth orbit (LEO)-low earth orbit (LEO) configuration.

8. The hybrid satellite communication system of claim 7, the high-throughput antenna of the low earth orbit (LEO)-low earth orbit (LEO) configuration including a full-duplex transmitter array and a full-duplex receiver array, the full-duplex transmitter array and the full-duplex receiver array being configured to operate simultaneously.

9. The hybrid satellite communication system of claim 7, the high-throughput antenna of the low earth orbit (LEO)-low earth orbit (LEO) configuration including a transmission/receiver half-duplex array, the transmission/receiver half-duplex array being configured to switch between and operate either a transmitting channel or a receiving channel at a particular time.

10. The hybrid satellite communication system of claim 1, the hybrid antenna being in a low earth orbit (LEO)-geostationary earth orbit (GEO) configuration.

11. The hybrid satellite communication system of claim 10, the high-throughput antenna of the low earth orbit (LEO)-geostationary earth orbit (GEO) configuration including a full-duplex transmitter array and a full-duplex receiver array, the full-duplex transmitter array and the full-duplex receiver array being configured to operate simultaneously.

12. The hybrid satellite communication system of claim 1, the multi-constellation modem manager being configured to receive data from an aircraft sensor of the aircraft on which the hybrid antenna is mounted.

13. The hybrid satellite communication system of claim 1, the multi-constellation modem manager being configured to receive data from an aircraft component of the aircraft on which the hybrid antenna is mounted.

14. The hybrid satellite communication system of claim 1, the multi-constellation modem manager being configured to receive data or transmit data from an aircraft performance module.

15. A hybrid antenna of a hybrid satellite communication system for cockpit, cabin, and crew connectivity, the hybrid antenna mountable on an exterior surface of an aircraft, the hybrid antenna comprising:
    an L-band antenna configured to communicate with an L-band antenna modem card of a multi-constellation modem manager; and
    a high-throughput antenna configured to operate on at least one of a ku-band or a ka-band, the high-throughput antenna configured to communicate with a high-throughput modem card of the multi-constellation modem manager,
    the multi-constellation modem manager being configured for simultaneous operation on multiple satellite constellations by simultaneously communicating via the L-band antenna and the high-throughput antenna.

* * * * *